(12) United States Patent
Gotschlich

(10) Patent No.: US 9,141,198 B2
(45) Date of Patent: Sep. 22, 2015

(54) CONTROL OF A CONTROL PARAMETER BY GESTURE RECOGNITION

(71) Applicant: Infineon Technologies AG, Neubiberg (DE)

(72) Inventor: Martin Gotschlich, Markt Schwaben (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/142,583

(22) Filed: Dec. 27, 2013

(65) Prior Publication Data

US 2014/0333522 A1    Nov. 13, 2014

Related U.S. Application Data

(60) Provisional application No. 61/749,931, filed on Jan. 8, 2013.

(51) Int. Cl.
    *G06F 3/045*    (2006.01)
    *G06F 3/01*    (2006.01)
    *G06F 3/042*    (2006.01)

(52) U.S. Cl.
    CPC    *G06F 3/017* (2013.01); *G06F 3/01* (2013.01); *G06F 3/011* (2013.01); *G06F 3/042* (2013.01); *G06F 2203/04101* (2013.01)

(58) Field of Classification Search
    CPC ..... G06F 3/017; G06F 3/03545; G06F 3/041; G06F 3/042; G06F 3/044; G06F 2203/04101; G06F 2203/04108
    See application file for complete search history.

(56) References Cited

U.S. PATENT DOCUMENTS

| | | | |
|---|---|---|---|
| 7,053,357 B2 | 5/2006 | Schwarte | |
| 8,553,002 B2* | 10/2013 | Homma et al. | 345/173 |
| 2006/0161871 A1* | 7/2006 | Hotelling et al. | 715/863 |
| 2007/0125633 A1* | 6/2007 | Boillot | 200/52 R |
| 2008/0042985 A1* | 2/2008 | Katsuhito et al. | 345/173 |
| 2009/0091540 A1* | 4/2009 | Doan et al. | 345/173 |
| 2010/0004029 A1* | 1/2010 | Kim | 455/566 |
| 2010/0090964 A1* | 4/2010 | Soo et al. | 345/173 |
| 2010/0279738 A1* | 11/2010 | Kim et al. | 455/566 |
| 2011/0138336 A1* | 6/2011 | Kim | 715/848 |
| 2011/0175832 A1* | 7/2011 | Miyazawa et al. | 345/173 |
| 2012/0113018 A1* | 5/2012 | Yan | 345/173 |
| 2013/0106898 A1* | 5/2013 | Saint-Loubert-Bi et al. | 345/592 |

* cited by examiner

*Primary Examiner* — Joe H Cheng
(74) *Attorney, Agent, or Firm* — SpryIP, LLC

(57) ABSTRACT

A method for controlling at least one control parameter of a control element comprises determining first information indicating a distance between a part of a human body and a reference. Based on the first information, determining second information indicating a transformation relation between a gesture movement of the part of the human body and an effected change of the control parameter by the gesture movement. The transformation relation is modified based on a change of the distance between the human body and the reference.

30 Claims, 3 Drawing Sheets

CONTROL OF A CONTROL PARAMETER BY GESTURE RECOGNITION

RELATED APPLICATIONS

This application is a non-provisional application of provisional application 61/749,931, which was filed on Jan. 8, 2013. The entire contents of the indicated provisional application are hereby incorporated herein by reference.

BACKGROUND

Three dimensional (3D) Depth-Cameras which are for example based on the ToF principle (time-of-flight principle) provide a new field for human gesture recognition in natural user interfaces. For example, such 3D depth cameras may be used for mouse replacement in the cubic foot in front of a notebook computer. It would be beneficial to have a control of control parameter based on human gesture recognition which allows easy and secure control of the control parameter.

SUMMARY

According to an aspect, a method for controlling at least one control parameter of a control element comprises determining first information indicating a distance between a part of a human body and a reference. Based on the first information, determining second information indicating a transformation relation between a gesture movement of the part of the human body and an effected change of the control parameter by the gesture movement. The transformation relation is modified based on a change of the distance between the human body and the reference.

According to a further aspect, a device comprises a unit configured to determine first information indicating a distance between a part of a human body and a reference. A circuit is configured to determine based on the first information second information indicating a transformation relation between a gesture movement of the part of the human body and an effected change of the control parameter by the gesture movement. The circuit is configured to modify the transformation relation based on a change of the distance between the human body and the reference.

DETAILED DESCRIPTION

Figure 1:
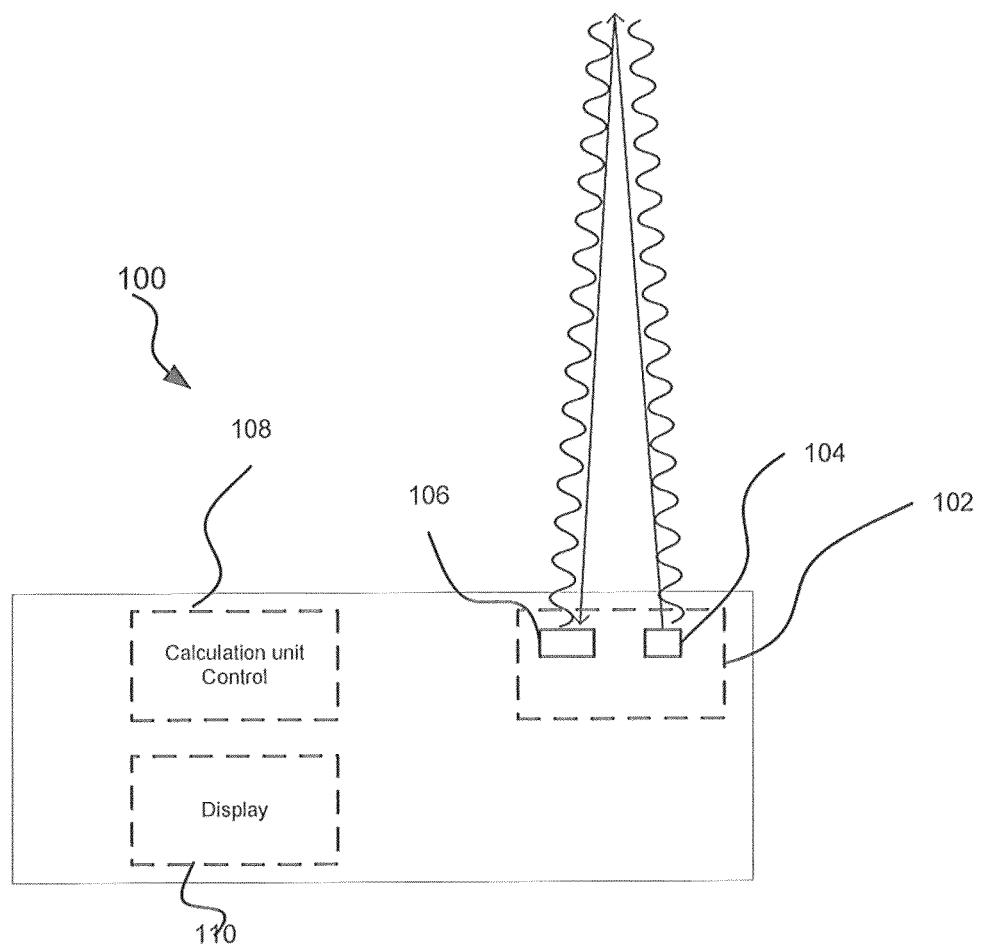
FIG. 1 shows a diagram according to an embodiment of the present invention.

The following detailed description explains exemplary embodiments of the present invention. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number. Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

In the described embodiments, various specific views or schematic views of elements, devices, features, etc. are shown and described for a better understanding of embodiments. It is to be understood that such views may not be drawn to scale. Furthermore, such embodiments may not show all features, elements etc. contained in one or more figures with a same scale, i.e. some features, elements etc. may be shown oversized such that in a same figure some features, elements, etc. are shown with an increased or decreased scale compared to other features, elements etc.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The embodiments described below are directed to a new concept for control of a control element by human gesture recognition.

FIG. 1 shows a device 100 having a unit 102 to determine three dimensional distance information with regards to human objects or a part of a human objects such as for example a hand/finger gesture. Unit 102 comprises a transmitter 104 to transmit light to the human object and a receiver 106 to obtain 3 dimensional distance information with regards to the human object based on the traveled distance of the light reflected by the object. In other embodiment, unit 102 may use other 3D camera principles to obtain 3D information with regards to the object.

The device 100 includes a computation and control unit 108 which may be hardware based, software/firmware based or a mixture thereof. Computation unit 108 receives the 3 dimensional information from unit 102 and determines the distance between a part of the human object and a reference. The reference may for example include a surface of a display 110 or other appropriate surfaces or planes or other reference locations. In one embodiment, computation unit 108 may recognize a specific part of the human body e.g. a gesture performed by the user. In one embodiment, the specific part of the human body may be one or more fingers, a hand or a gesture performed by a finger and the hand etc. Based on the recognized part of the human body, the control unit determines a first information indicating a distance with respect to the reference. As will be outlined below, the determined first information will be used to set or modify a transformation relation between a gesture movement of the part of the human body and an effected change of the control parameter by the gesture movement.

Figure 2:
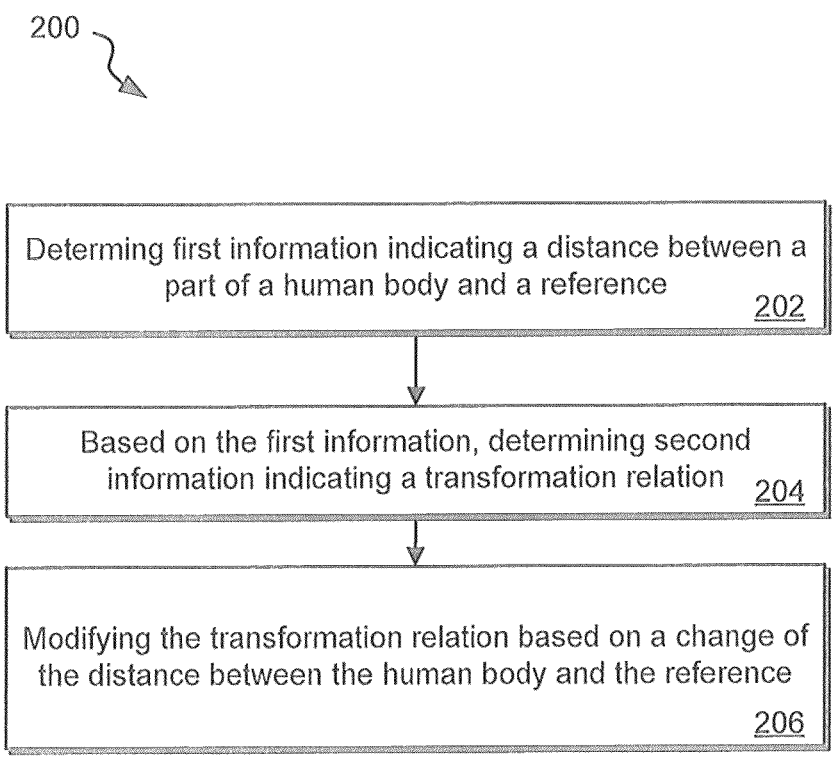
FIG. 2 shows a flow chart diagram according to an embodiment of the present invention.

FIG. 2 shows a flow diagram 200 according to one embodiment. The first information indicating a distance between a part of a human body and a reference is determined in 202. Then, based on the first information second information is determined indicating a transformation relation between a gesture movement of the part of the human body and an effected change of the control parameter by the gesture movement, see 204. At 206, the transformation relation is dynamically modified based on a change of the distance between the human body and the reference.

The control element may be displayed on the display 110 together with visual information indicating a current value of the control parameter setting on the display.

During the modification of the transformation relation, the size of the control element maintains unchanged in an embodiment. In another embodiment, a scale for indicating the current value of the parameter on the display may change such as for example by focusing or defocusing with respect to the environment of the current parameter value setting, when the transformation relation is modified.

The control element displayed on display 110 may be controlled by a gesture movement of the part of the human body and the transformation relation is an indication of the change of the control parameter in relative or absolute units per moved unit of the gesture movement.

The gesture movement distance may be a distance of the movement of the part of the body in a direction predetermined by visual information for example by the displayed control element.

In some embodiments, the modifying may be dependent on whether a certain gesture is performed. Thus, only when a specific gesture is performed by a user with the part of the body and recognized by device 100, the modifying of the transformation relation is performed.

In some embodiment, the device 100 may not only be operable in the dynamic adaption mode in which the gesture translation relation is changed in accordance with the distance but also a switching to a gesture recognition control mode may be effected in which a translation relation is maintained independent of the distance between the part of the human body and the reference.

In some embodiments, the transformation relation may be modified linearly with the distance between the part of the human body and the reference. However other non-linear relationships such as logarithm or exponential modifications or combinations of linear and non-linear modifications may be provided.

Figure 3:
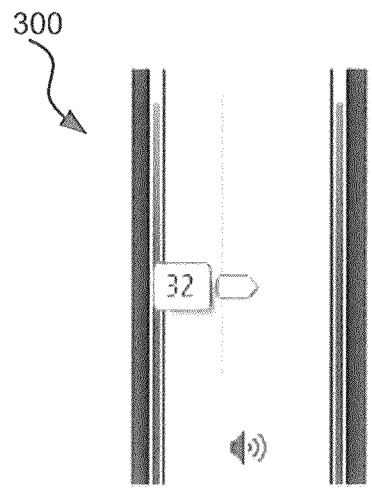
FIG. 3 shows a diagram according to an embodiment of the present invention.

FIG. 3 shows an example of a control element which includes a slider 300 for control. While embodiments may be explained with respect to a slider as a control element it is to be understood that other embodiments may encompass other types of control elements such as pivotal control elements or others. Furthermore, while embodiments may be explained with respect to virtual control elements which may be displayed on a display such as a screen permanently or when a control change or control adaption is required or initiated, it is to be understood that other embodiments may use other control elements including fixed control elements or permanently displayed control element. The slider 300 shown in FIG. 3 may be a typical element of a man-machine-interface (MMI). By moving a virtual sliding element between its two end positions (xmin and xmax), a related parameter value (x) is adjusted accordingly. An example of an adjustment slider as shown in FIG. 1 may be a volume control element for controlling a volume of a loudspeaker.

In a 3D-gesture user interface the virtual slider may be moved by a specific finger/hand gesture where the slider is following the finger movement. For example, moving the hand/fingers upwards moves the slider upwards and vice versa.

In some implementations the slider virtually representing a parameter (x) is following the hand/finger position (pos) according to a proportional relationship (k).

$$delta\_x = k \cdot delta\_pos$$

For example, moving the hand/fingers by delta_pos=1 cm causes as slider movement of delta_x=2 mm→k=0,2.

The proportional relationship (k) between hand/finger movement and affected parameter change may be adapted according to the distance (d) between hand/fingers and the screen where the slider is displayed.

$$k = f(d)$$

A short distance results in a direct coarse change of the parameter value using only small hand/finger movements (high k value). A long distance results in an indirect fine change of the parameter value using wide small hand/finger movements (low k value).

The same principle may not only be applied to linear 1-dimensional sliding elements but also to 2-dimensional sliding areas where a slider is positioned in an area representing two parameter values (e.g. x- and y-axis).

Then a first control parameter may be controlled by a gesture movement in a first direction and a second control parameter may be controlled by a gesture movement in a second direction different from the first direction. Similar to the one-dimensional embodiment, a first translation relation corresponding to the first control parameter is determined based on the determined distance of the hand/finger and a second translation relation corresponding to the second control parameter is determined based on the determined distance of the hand/finger.

Without a change of the environment of the control interface or by having physically to touch control elements, the user is thus enabled to actively change the gesture transformation relation on its own by moving closer or father away from the reference.

Figure 4:
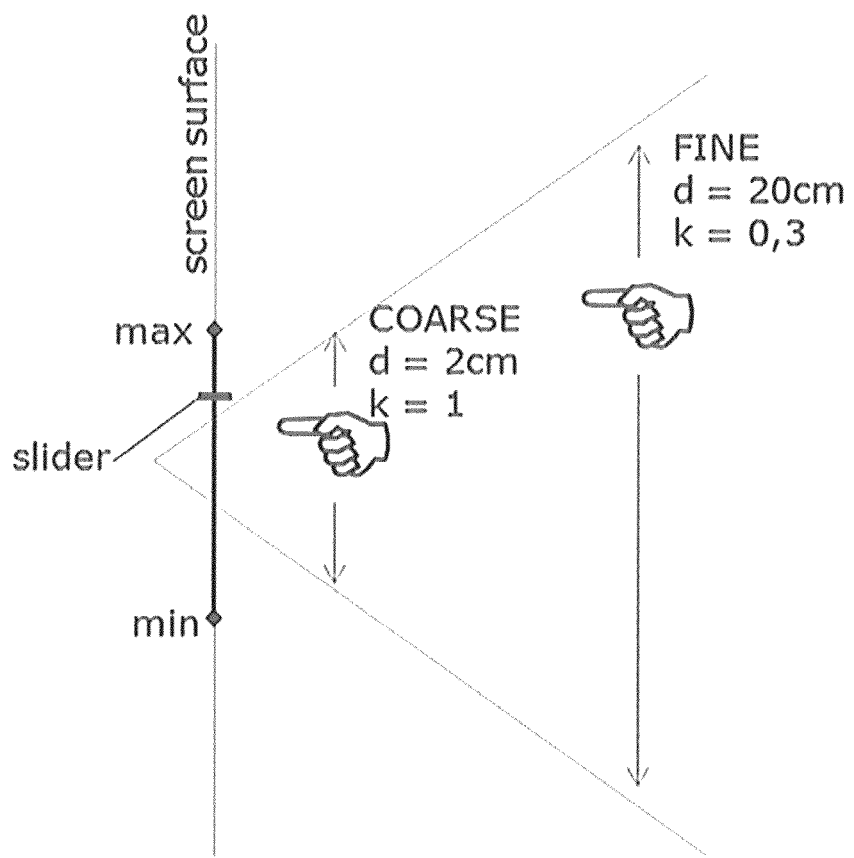
FIG. 4 shows a controlling by a user according to an embodiment of the present invention.

Thus, by taking the distance between a reference for example a screen or other reference plane or surface or a reference point and the hand/fingers into account, both coarse and fine adjustments of a parameter value represented by a virtual slider are enabled in a natural manner as shown in FIG. 4.

Typically, the reference may be a predetermined location or plane such as for example a predetermined position on the display of the device or a surface of the device. The distance information may therefore include the relative distance of the part of the body with respect to this location or the relative distance of the part of the human body with respect to the plane, i.e. the minimum distance of the detected part of the human body with respect to the plane which is the distance of the normal vector from the plane to the human body.

It becomes clear from the above that the described new gesture recognition control provides an easier, faster and more secure control of the control parameters allowing a more fine-adjusted setting in less time than conventional controls.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" or "unit" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter, receiver or transceiver may be implemented in sub-entities such as a chip or a circuit provided in such an entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

Furthermore, it is intended to include in this detailed description also one or more of described features, elements etc. in a reversed or interchanged manner unless otherwise noted.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple sub steps. Such sub steps may be included and part of the disclosure of this single step unless explicitly excluded.

What is claimed is:

1. A method for controlling at least one control parameter of a control element, the method comprising:
determining first information indicating a distance between a part of a human body and a reference;

based on the first information, determining second information indicating a transformation relation between a gesture movement of the part of the human body and an effected change of the control parameter by the gesture movement; and modifying the transformation relation based on a change of the distance between the human body and the reference.

2. The method according to claim 1, further comprising: displaying the control element on a display; and displaying visual information indicating the current value of the control parameter setting on the display.

3. The method according to claim 2, wherein the size of the control element maintains unchanged, when the transformation relation is modified.

4. The method according to claim 3, wherein the control element is controlled by a gesture movement of the part of the human body, and wherein the transformation relation indicates a change of the control parameter per unit gesture movement distance.

5. The method according to claim 4, wherein the gesture movement distance is a distance of the movement of the part of the body in a direction predetermined by the displayed control element.

6. The method according to claim 2, wherein a scale for indicating the current value of the parameter on the display changes, when the transformation relation is modified.

7. The method according to claim 1, wherein the control element is a slider.

8. The method according to claim 1, wherein the control element is a pivotal element.

9. The method according to claim 1, further comprising
controlling a first control parameter by a gesture movement in a first direction;
controlling a second control parameter by a gesture movement in a second direction different from the first direction;
determining a first translation relation corresponding to the first control parameter based on the distance; and
determining a second translation relation corresponding to the second control parameter based on the distance.

10. The method according to claim 1, wherein the transformation relation is continuously modified based on a change of the distance between the part of the human body and the reference.

11. The method according to claim 1, wherein the transformation relation is modified linearly with the distance between the part of the human body and the reference.

12. The method according to claim 1, further comprising: recognizing the part of the body based on distance information in three dimensions.

13. The method according to claim 1, further comprising: recognizing a gesture performed by a user with the part of the body, wherein determining first information, determining second information and modifying the transformation relation is performed only when a predetermined gesture is recognized.

14. The method according to claim 1, further comprising: switching to a gesture recognition control mode in which a translation relation is maintained independent of the distance between the part of the human body and the reference.

15. The method according to claim 1, wherein the transformation relation is modified to obtain a more coarse adjustment of the control parameter value by a gesture movement when the distance between the part of the human body and the reference is decreased and is modified to obtain a more fine adjustment of the control parameter value by a gesture movement when the distance between the part of the human body and the reference is increased.

16. A device comprising:
a unit configured to determine first information indicating a distance between a part of a human body and a reference;
a circuit configured to determine based on the first information second information indicating a transformation relation between a gesture movement of the part of the human body and an effected change of the control parameter by the gesture movement, wherein the circuit is configured to modify the transformation relation based on a change of the distance between the human body and the reference.

17. The device according to claim 16, further comprising:
a display configured to display the control element and information indicating a current value of the control parameter on the display.

18. The device according to claim 17, wherein the size of the control element maintains unchanged, when the transformation relation is modified.

19. The device according to claim 17, wherein the device is configured to change a scale for indicating the current value of the parameter on the display, when the transformation relation is modified.

20. The device according to claim 16, wherein the device is configured to control the control element by a gesture movement of the part of the human body, and wherein the circuitry is configured to provide the transformation relation indicating a change of the control parameter per unit gesture movement distance.

21. The device according to claim 20, wherein the device is configured to indicate on a display a predetermined direction, wherein the gesture movement distance is a distance of the movement of the part of the body in the predetermined direction.

22. The device according to claim 16, wherein the control element is a slider.

23. The device according to claim 16, wherein the control element is a pivotal element.

24. The device according to claim 16, wherein the device is configured to control a first control parameter by a gesture movement in a first direction and to control a second control parameter by a gesture movement in a second direction different from the first direction, wherein the device is further configured to determine a first translation relation corresponding to the first control parameter based on the distance and to determine a second translation relation corresponding to the second control parameter based on the distance.

25. The device according to claim 16, wherein the device is configured to continuously modify the transformation relation based on a change of the distance between the part of the human body and the reference.

26. The device according to claim 16, wherein the device is configured to modify the transformation relation linearly with the distance between the part of the human body and the reference.

27. The device according to claim 16, wherein the device is further configured to recognize the part of the body based on distance information in three dimensions.

28. The device according to claim 16, wherein the device is configured to recognize a gesture performed by a user with the part of the body such that the transformation relation is only modified when a predetermined gesture is recognized.

29. The device according to claim 16, further comprising switching to a gesture recognition control mode in which a translation relation is maintained independent of the distance between the part of the human body and the reference.

30. The device according to claim 16, wherein the device is configured to modify the transformation relation such that a more coarse adjustment of the control parameter value by a gesture movement is obtained when the distance between the part of the human body and the reference is decreased, and such that a more fine adjustment of the control parameter value by a gesture movement is obtained when the distance between the part of the human body and the reference is increased.

* * * * *